United States Patent [19]

Hallbauer et al.

[11] 4,265,109

[45] May 5, 1981

[54] WRENCH WITH ANGULAR ROTATION READOUT

[75] Inventors: Hans-Dieter Hallbauer; Fritz G. H. Gast; Klaus-Werner Hoenow; Armin Rahn, all of Hamburg, Fed. Rep. of Germany

[73] Assignee: C. Plath KG, Hamburg, Fed. Rep. of Germany

[21] Appl. No.: 83,730

[22] Filed: Oct. 10, 1979

Related U.S. Application Data

[63] Continuation of Ser. No. 869,403, Jan. 16, 1978, abandoned, which is a continuation of Ser. No. 733,294, Oct. 18, 1976, abandoned.

[30] Foreign Application Priority Data

Oct. 25, 1975 [DE] Fed. Rep. of Germany ....... 2547815

[51] Int. Cl.³ .............................................. B25B 23/14
[52] U.S. Cl. .................................... 73/862.23; 73/761
[58] Field of Search ....................... 73/88 F, 139, 761; 81/52.4 R, 52.44, 52.4 B; 116/124 R; 33/334, 364

[56] References Cited

U.S. PATENT DOCUMENTS

| | | | |
|---|---|---|---|
| 1,294,710 | 2/1919 | Roland | 116/124 R |
| 2,734,412 | 2/1956 | Orner | 81/52.4 |
| 2,889,729 | 6/1959 | Orner | 73/761 X |
| 3,011,264 | 12/1961 | Parera | 33/364 |
| 3,392,678 | 12/1966 | Noga | 81/52.4 R |
| 3,568,329 | 3/1971 | Campbell | 33/364 |
| 3,962,910 | 6/1976 | Spyridakis et al. | 73/761 |
| 4,091,664 | 5/1978 | Zerver | 73/139 |

*Primary Examiner*—Charles A. Ruehl

[57] ABSTRACT

A wrench is disclosed which provides a readout of its angle of rotation by means of an inertial body mounted in a housing affixed to the wrench. Manual and automatic means are provided for determining the rotation of the housing with respect to the body.

4 Claims, 2 Drawing Figures

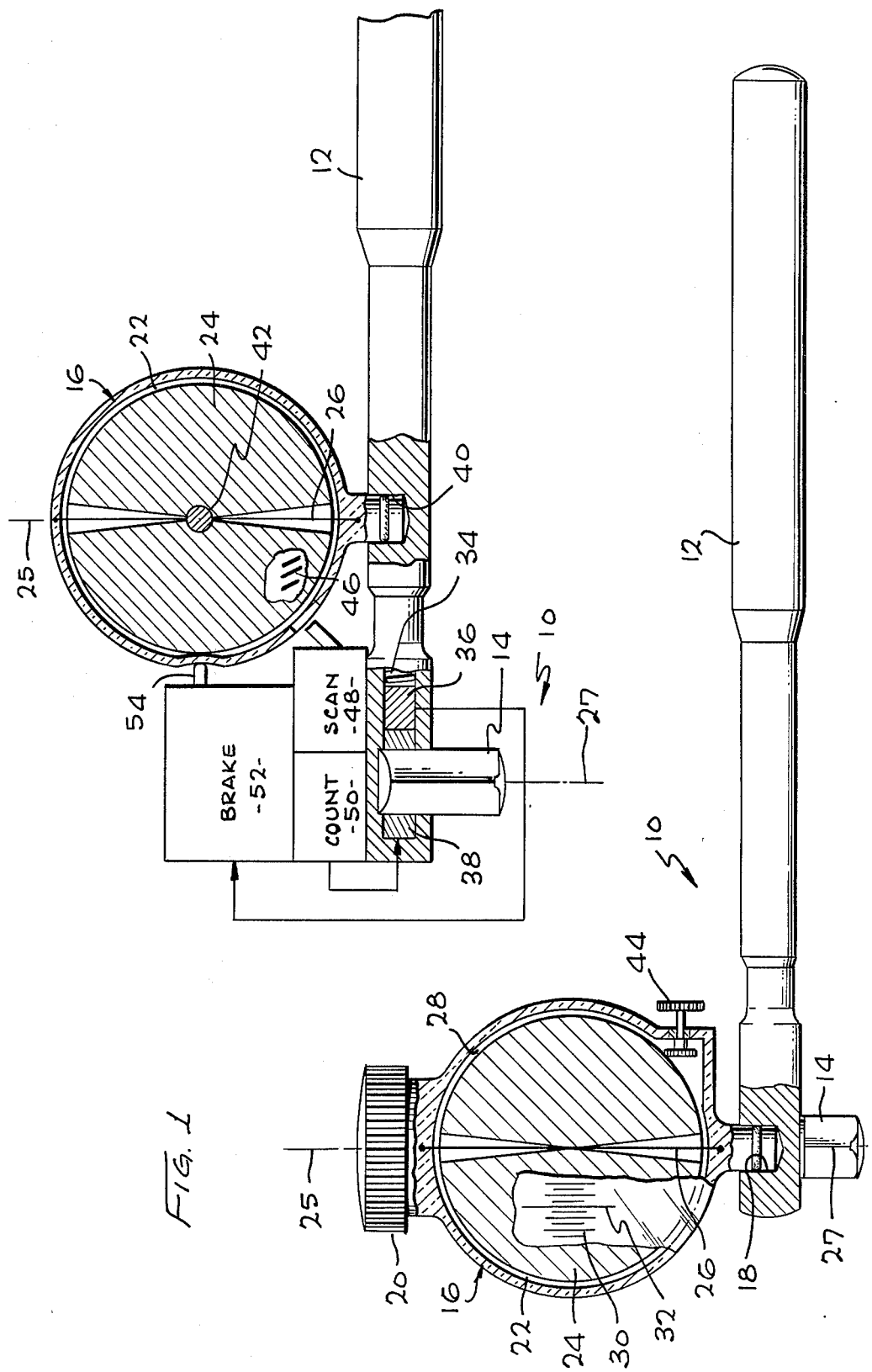

WRENCH WITH ANGULAR ROTATION READOUT

This is a continuaton of application Ser. No. 869,403, filed Jan. 16, 1978, now abandoned, which, in turn, was a continuation of application Ser. No. 733,294, filed Oct. 18, 1976, now also abandoned.

BACKGROUND OF THE INVENTION

1. Field of the Invention

This invention relates to tools, such as wrenches and screwdrivers, for applying a rotational force to a workpiece such as a nut, bolt or screw to loosen or tighten the bolt against a correspondingly threaded part of a stationary object, such as a bolt hole. This invention relates generally to torque wrenches which are used to provide a preselected amount of torque to the bolt, or to measure the amount of torque so provided. In particular, this invention relates to tools for providing or determining the degree of angular rotation applied to the bolt during tightening or loosening.

The torque to be applied to the bolt is often specified by the designer of the equipment being manufactured. A common example of this is the torque specifications for bolts securing the head or an internal combustion engine.

2. Description of the Prior Art

It is well known that specifying the angle of rotation of the bolt, after a predetermined torque has been reached, is a more accurate way of specifying the holding force of the bolt and the stresses involved. In particular, it is known to be desirable to specify the angular rotation to be applied to the bolt in order to reduce the size and strength of the bolt required for a certain value of holding power. Conventional tools for measuring the angle of rotation have been of two basic types.

The first type utilizes an indicator such as a pointer, rigidly mounted to the wrench and an angular scale rigidly affixed to the bolt hole. The bolt is first tightened to a predetermined low-value of torque or to the condition known as "finger tight". The movement of the pointer along the scale thereafter indicates the angle of rotation of the bolt so that the bolt can be tightened to a predetermined angular rotation.

A second type uses a compass-like arrangement mounted to the wrench and a source of magnetic field such as a permanent magnet mounted to the bolt hole. The magnetic field keeps the compass in a fixed orientation with respect to a reference, such as the North Pole, during tightening so that the change in orientation of the "compass" during tightening indicates the angular rotation of the bolt in the bolt hole.

Both of these designs, however, have a major disadvantage in that an object must be positioned in a fixed relationship with the bolt hole. Another disadvantage of such designs are that they are constructed for use in a manufacturing environment, such as on a production line, but are not convenient for use by a mechanic or other operator in a repair facility.

SUMMARY OF THE INVENTION

The instant invention avoids the limitations of known devices by providing an inertial body mounted for rotation in a housing affixed to the wreach. This inertial body does not require the use of an external reference, such as the angular scale or magnetic source mounted on the bolt hole, but rather uses the initial position of the inertial body as a reference. The device of the instant invention may be provided with a reference mark and scale, one of which is affixed to the housing and the other to the inertial body, for determining the angular rotation between the body and the housing. This rotation is equal to the rotation of the bolt by the wrench. The rotation of the inertial body with respect to the housing may be determined visually by an operator or by automatic equipment, such as photoelectric devices. A counter, responsive to markings on the inertial body, may be used to automatically indicate when a preset angular rotation has been achieved.

A brake may be provided for restricting rotation of the inertial body so that it may be released at a predetermined time, such as the attainment of the preselected torque. Further, the automatic device for indicating the angular rotation of the bolt may be arranged to automatically disengage the wrench from rotation of the bolt when a predetermined angular rotation has been achieved.

The axis of rotation of the inertial body may coincide with or be displaced from the axis of rotation of the wrench and bolt. The inertial body may conveniently include a solid body neutrally buoyant in a fluid. The solid body and the housing may be separately manually adjustable to respective initial positions.

BRIEF DESCRIPTION OF THE DRAWINGS

FIG. 1 is a side view of a tool according to the instant invention having an inertial body mounted for rotation in a housing coaxial with the axis of rotation of the bolt.

FIG. 2 is a side view of an alternate embodiment of the instant invention in which the inertial body is mounted for rotation in a housing on the wrench displaced from the axis of rotation of the bolt.

DETAILED DESCRIPTION OF THE PREFERRED EMBODIMENTS

FIG. 1 is a side view of wrench 10 according to a first embodiment of the invention. Wrench 10 includes handle 12 which may be manually operated to cause rotation of bit 14. Bit 14 is the drive member of a socket wrench or other tool for loosening or tightening the bolt in a bolt hole. Housing 16 is mounted in opening 18 of wrench 10. Housing 16 may conveniently be spherical in shape and be constructed at least in part from a transparent material. Knob 20 may be used for rotating housing 16 with respect to wrench 10. Housing 16 includes an internal chamber 22 in which solid body 24 is mounted for rotation along axis 25, coaxial with axis of rotation 27 of bit 14. Body 24 is floating in fluid 28 which fills the remainder of chamber 22 except for a small space, not shown, which may allow for temperature expansion. The densities of materials of body 24 and fluid 28 are chosen such that body 24 is neutrally buoyant in the fluid. This arrangement provides an extremely low-friction support for body 24, which has a relatively high moment of inertia with respect to the frictional moment of its support. In this manner, rotation of wrench 10 and therefore housing 16 will not result in rotation of body 24 from its initial angular orientation. That is, if the initial angular orientation of the body is, for example, parallel to a line of latitude at the beginning of a bolt tightening sequence, such orientation will not change during or after the sequence.

In this manner, the angular orientation of body 24 serves as a reference about which housing 16 is rotated. The change in orientation between body 24 and housing 16 is directly related to the angle or rotation of the bolt. This change in orientation may be determined in many ways. One simple way is by means of angular scale 30 and reference mark 32. Mark 32 may be mounted on transparent housing 16 and angular scale 30 may be mounted on solid body 24 or vice versa. In any event, the relative positions of angular scale 30 and reference mark 32 may be used to indicate an arbitrary angular reading from scale 30. The difference in angular readings before and after rotation of the bolt indicate the angular rotation thereof. It may be convenient to rotate housing 16 by means of knob 20 to align mark 32 with a preselected angular value, such as 0 degrees, before rotation of the bolt is begun.

Chamber 22 also includes initial position adjusting mechanism 44. This may simply be a shaft sealably passing through housing 16 having a manually operable knob on one end and a disc positioned within chamber 22 for contact with body 24 on the other end. In FIG. 1, mechanism 44 is shown in a left-most position in which it contacts body 24. The initial position of body 24 may thereby be adjusted. After adjusting, mechanism 44 may be moved to the right so that it will not interfere with rotation of body 24. Mechanism 44 may also be used as a brake mechanism to prevent rotation of body 24. As noted above it may be desirable to rotate body 24 by means of mechanism 44 or housing 16 means of knob 20 or both to provide an initial orientation therebetween.

FIG. 2 is a side view of an alternate embodiment of the instant invention in which wrench 10 is a torque wrench of conventional design having spring 34 mounted in handle 12. Spring 34 acts upon adjustable torque sensor 36 which serves to transmit the turning moment applied by handle 12 to bit 14. Sensor 36 will indicate by, for example, a change in position when a preselected torque has been attained. Mounted between torque sensor 36 and bit 14 is clutch 38 which may be used to disengage bit 14 from handle 12. The purpose of clutch 38 will be discussed hereinbelow. Housing 16 is mounted in opening 40 in handle 12 and includes central chamber 22 in which is mounted body 24 in the same manner as the embodiment of FIG. 1. Body 24 is mounted on pivot 26 by means of bearing 42. Axis of rotation 25 of body 24 is along pivot 26 and, as shown in FIG. 2, is displaced from axis of rotation 27 of bit 14. Although this means that housing 16 is displaced during a tightening or loosening operation, the change in angular rotation between body 24 and housing 16 is still directly related to the angular rotation of bit 14.

Scale markings 46 are mounted on the outer surface of body 24 for rotation therewith. Markings 46 may conveniently be equally spaced areas of light and dark which may be read by means of conventional scanning equipment such as photoelectric sensor 48. Sensor 48 generates a pulse whenever one of the marks in marking 46 passes by a reference point. Counter 50 counts the pulses generated by scanner 48. The number of pulses counted represents the change in orientation of body 24 with respect to housing 16. Counter 50 may include circuitry for generating an output signal when a preselected count value is reached. This output signal may be utilized to disengage clutch 38 so that after a predetermined angular rotation has been achieved, further rotation of handle 12 will not be transmitted to bit 14.

Brake mechanism 52 is mounted on handle 12 and includes brake rod 54 which is moved by brake 52 into contact with housing 16. Housing 16 is deformable, at least in the area of contact, so that actuation of rod 54 deforms housing 16 into contact with body 24. This restricts rotation of body 24. Brake 52 may be manually operable so that it is released when the angle of rotation of the bolt is to be measured. This may conveniently be done after the bolt has been tightened to a predetermined torque setting, such as finger-tight. This would be the setting achievable comfortably by hand and is indicated by a greatly increased resistance to turning. Brake 52 may also be actuable by torque sensor 36. In this manner, a preselected initial torque value may be more accurately specified.

Operation of the tool shown in FIG. 2 may be accomplished as follows. Brake 52 is actuated to prevent rotation of body 24 and clutch 38 is actuated to transmit the turning force from handle 12 to bit 14. The desired initial torque setting is preset in sensor 36 and the desired angular rotation count is provided to counter 50. Rotation of bit 14 is accomplished while preventing rotation of body 24 until the preselected torque setting is determined by sensor 36. This disengages brake 54 allowing body 24 to maintain its angular orientation with respect to a reference such as the bolt hole while housing 16 begins to rotate therearound. When the predetermined angular count is reached, counter 50 operates clutch 38 to disengage handle 12 from bit 14.

We claim:
1. A tool comprising:
tool means for applying a rotational force to a workpiece;
a housing mounted on the tool means;
an inertial body mounted for rotation in the housing, the body having a high moment of inertia with respect to the frictional moment of its mounting so that the angular orientation of the inertial body with respect to a fixed reference will not be substantially changed by rotation of the tool means about the axis of rotation of the workpiece;
brake means for selectively restricting rotation of the inertial body within the housing;
torque means for determining the torque applied by the tool means to the workpiece; and
means responsive to the torque means for deactivating the brake means to allow rotation of the inertial body when the torque reaches a preselected value.
2. The tool claimed in claim 1 wherein the brake means includes:
means for distorting the housing to restrict rotation of the inertial body
3. The tool claimed in claim 1, further comprising:
readout means to detect rotation of the housing with respect to the inertial body; and
means to indicate the detection of a preselected angular rotation.
4. An improved tool for applying rotational force to a work piece of the type having an inertial body mounted for rotation in a housing, wherein the improvement comprises:
torque means for indicating when a preselected torque has been applied by the tool to the work piece;
means for indicating when a preselected angular rotation of the housing with respect to the body has been achieved after indication that the preselected torque has been applied;
brake means for selectively restricting rotation of the inertial body with respect to the housing; and
means responsive to the torque means for deactivating the brake means upon indication that the preselected torque has been applied.

* * * * *